US012347945B2

(12) United States Patent
Kakuya et al.

(10) Patent No.: US 12,347,945 B2
(45) Date of Patent: Jul. 1, 2025

(54) WIRELESS COMMUNICATION DEVICE

(71) Applicant: DENSO CORPORATION, Kariya (JP)

(72) Inventors: Yuuji Kakuya, Nisshin (JP); Masakazu Ikeda, Nisshin (JP); Kenichiro Sanji, Kariya (JP); Tomokazu Miyashita, Kariya (JP); Ryozo Fujii, Kariya (JP); Masashi Urabe, Kariya (JP); Hiromichi Naito, Kariya (JP)

(73) Assignee: DENSO CORPORATION, Kariya (JP)

( * ) Notice: Subject to any disclaimer, the term of this patent is extended or adjusted under 35 U.S.C. 154(b) by 199 days.

(21) Appl. No.: 18/338,191

(22) Filed: Jun. 20, 2023

(65) Prior Publication Data

US 2023/0335907 A1 Oct. 19, 2023

Related U.S. Application Data

(63) Continuation of application No. PCT/JP2021/046687, filed on Dec. 17, 2021.

(30) Foreign Application Priority Data

Dec. 23, 2020 (JP) ................................ 2020-213995

(51) Int. Cl.
*H01Q 9/04* (2006.01)
*H01Q 1/32* (2006.01)

(52) U.S. Cl.
CPC ......... *H01Q 9/0407* (2013.01); *H01Q 1/3283* (2013.01)

(58) Field of Classification Search
CPC .......... H01Q 1/24; H01Q 1/32; H01Q 1/3283; H01Q 9/0407
See application file for complete search history.

(56) References Cited

U.S. PATENT DOCUMENTS

2010/0289619 A1 11/2010 Kosugi et al.
2013/0225102 A1* 8/2013 Tsutsumi .............. H01Q 23/00 257/E31.11

(Continued)

FOREIGN PATENT DOCUMENTS

JP 5341611 B2 11/2013
JP 2018061137 A 4/2018

*Primary Examiner* — Daniel Munoz
(74) *Attorney, Agent, or Firm* — Harness, Dickey & Pierce, P.L.C.

(57) ABSTRACT

A wireless communication device for transmitting and receiving radio waves of a target frequency includes a ground plate having a rectangular shape, a zeroth-order resonant antenna element arranged at a position shifted from a center of the ground plate in a lengthwise direction of the ground plate, and a circuit module configured to transmit and receive signal via the zeroth-order resonant antenna element. The zeroth-order resonant antenna element includes a counter conductor plate arranged at a predetermined distance from the ground plate and having a feed point connected to a feedline, and a short circuit portion electrically connecting the counter conductor plate and the ground plate. The ground plate, the counter conductor plate and the short circuit portion are configured to cause parallel resonance at the target frequency and satisfy a condition that resonance caused by the ground plate is reduced.

6 Claims, 8 Drawing Sheets

(56) References Cited

U.S. PATENT DOCUMENTS

| | | | | |
|---|---|---|---|---|
| 2019/0229411 | A1 | 7/2019 | Sugimoto et al. | |
| 2020/0335857 | A1* | 10/2020 | Shoji | H01Q 21/0031 |
| 2022/0263245 | A1* | 8/2022 | Matsumoto | H01Q 1/526 |

* cited by examiner

WIRELESS COMMUNICATION DEVICE

CROSS REFERENCE TO RELATED APPLICATIONS

The present application is a continuation application of International Patent Application No. PCT/JP2021/046687 filed on Dec. 17, 2021 which designated the U.S. and claims the benefit of priority from Japanese Patent Application No. 2020-213995 filed on Dec. 23, 2020, and all the contents of the above applications are incorporated herein by reference.

TECHNICAL FIELD

The present disclosure relates to a wireless communication device using a zeroth-order resonant antenna.

BACKGROUND

An antenna device includes a ground plate which is a flat metal conductor for providing a ground potential, a counter conductor plate which is a flat metal conductor disposed to face the ground plate and provided with a feeding point, and a short circuit portion which electrically connects the ground plate and the counter conductor plate.

SUMMARY

According to at least one embodiment of the present disclosure, a wireless communication device includes a ground plate, a zeroth-order resonant antenna element and a circuit module.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
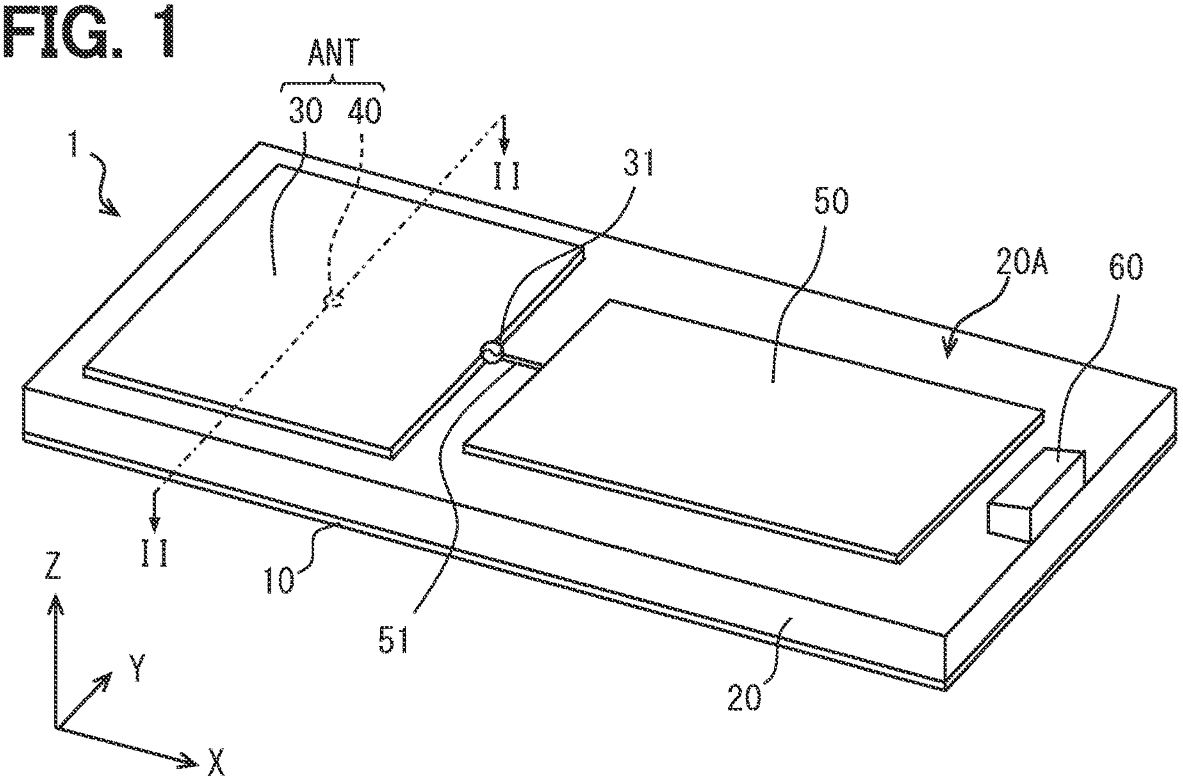
FIG. 1 is an external perspective view of a wireless communication device.

To begin with, examples of relevant techniques will be described. An antenna device according to a comparative example includes a ground plate which is a flat metal conductor for providing a ground potential, a counter conductor plate which is a flat metal conductor disposed to face the ground plate and provided with a feeding point, and a short circuit portion which electrically connects the ground plate and the counter conductor plate.

In this type of antenna, parallel resonance is generated at a frequency corresponding to a capacitance and an inductance. The capacitance is formed between the ground plate and the counter conductor plate, and the inductance is included in the short circuit portion. The capacitance formed between the ground plate and the counter conductor plate is determined according to an area of the counter conductor plate.

In the antenna device having the above-described configuration, a frequency (hereinafter, target frequency) of a signal to be transmitted and received in the antenna device can be set to a desired value by adjusting the area of the counter conductor plate or adjusting the distance between the ground plate and the counter conductor plate.

In the present disclosure, for the sake of convenience, an antenna device using LC resonance generated by a capacitance formed between a ground plate and a counter conductor plate and an inductance included in a short circuit portion is referred to as a zeroth-order resonant antenna or a metamaterial antenna.

The comparative example is merely related to a configuration of a zeroth-order resonant antenna, and does not includes a specific configuration of a wireless communication device integrally including a circuit module and an antenna module. The circuit module is, for example, a transceiver circuit or a power supply circuit.

In consideration of ease of mounting a wireless communication device on a vehicle, the inventors of the present disclosure have examined a configuration of a wireless communication device, in which a conductor wiring pattern as a ground plate is formed in a rectangular shape. An antenna element includes a counter conductor plate, and the antenna element and a circuit module are arranged in a lengthwise direction of the ground plate. In this configuration, the ground plate of the antenna element is extended to the lower side of the circuit module so as to be usable as a circuit ground.

In general, the larger the ground plate is, the more stable the operation as an antenna is. Therefore, according to the above-described examined configuration, it can be expected that the stability of the operation as an antenna is maintained. However, as a result of verifying the operation of the examined configuration, the inventors have found that, when the dimensions of the ground plate and the position of the counter conductor plate with respect to the ground plate satisfy specific conditions, the ground plate itself causes resonance at a frequency near the target frequency, and a leakage current to a communication cable may increase.

According to the present disclosure, a wireless communication device can reduce current leakage to a communication cable in a configuration using a zeroth-order resonant antenna.

According to an aspect of the present disclosure, a wireless communication device is used for transmitting and receiving radio waves of a predetermined target frequency. The wireless communication device includes a ground plate, a zeroth-order resonant antenna element and a circuit module. The ground plate is a conductor plate having a rectangular shape with a length less than λ/2 in a widthwise direction and a length of λ/2 or more in a lengthwise direction. λ is a wavelength of the predetermined target frequency. The zeroth-order resonant antenna element is arranged at a position shifted by a predetermined distance in the lengthwise direction from a center of the ground plate. The circuit module is configured to perform processing for signal transmission and signal reception by the zeroth-order resonant antenna element. The zeroth-order resonant antenna element and the circuit module are arranged side by side in the lengthwise direction of the ground plate. The zeroth-order resonant antenna element includes a counter conductor plate and a short circuit portion. The counter conductor plate is conductor member having a flat plate shape, is arranged at a predetermined distance from the ground plate, and has a feed point electrically connected to a feedline. The short circuit portion is arranged in a central region of the counter conductor plate and electrically connects the counter conductor plate and the ground plate. The ground plate, the counter conductor plate and the short circuit portion are configured such that an inductance of the short circuit portion and a capacitance between the ground plate and the counter conductor plate cause parallel resonance at the predetermined target frequency. A length of the ground plate in the lengthwise direction is set to satisfy $Lg=\lambda/4\times N+\alpha$, where N is a natural number, a is a predetermined value greater than or equal to 0.025λ and less than or equal to 0.225λ, and Lg is the length of the ground plate in the lengthwise direction.

The above configuration is based on finding that current leakage tends to be significant when the length of the ground plate in the lengthwise direction is an integer multiple of λ/4. According to the above configuration, the length of the ground plate deviates by a predetermined amount from an integer multiple of λ/4, which is a condition for operating as a monopole antenna, and the ground plate does not cause resonance. Therefore, current excited in the ground plate is also suppressed, and the current leakage to a communication cable can be reduced.

According to another aspect of the present disclosure, a wireless communication device is used for transmitting and receiving radio waves of a predetermined target frequency. The wireless communication device includes a ground plate, a zeroth-order resonant antenna element and a circuit module. The ground plate is a conductor plate having a rectangular shape with a length less than λ/2 in a widthwise direction and a length of λ/2 or more in a lengthwise direction. λ is a wavelength of the predetermined target frequency. The zeroth-order resonant antenna element is arranged at a position shifted by a predetermined distance in the lengthwise direction from a center of the ground plate. The circuit module is configured to perform processing for signal transmission and signal reception by the zeroth-order resonant antenna element. The zeroth-order resonant antenna element and the circuit module are arranged side by side in the lengthwise direction of the ground plate. The zeroth-order resonant antenna element includes a counter conductor plate and a short circuit portion. The counter conductor plate is conductor member having a flat plate shape, is arranged a predetermined distance from the ground plate, and has a feed point electrically connected to a feedline. The short circuit portion is arranged in a central region of the counter conductor plate and electrically connects the counter conductor plate and the ground plate. The ground plate, the counter conductor plate and the short circuit portion are configured such that an inductance of the short circuit portion and a capacitance between the ground plate and the counter conductor plate cause parallel resonance at the predetermined target frequency. The ground plate has an antenna near end that is one of ends of the ground plate closer to the counter conductor plate in the lengthwise direction. The counter conductor plate is positioned such that an end offset which is a distance from the antenna near end to the counter conductor plate is set to 0.075λ or more.

The above configuration is based on finding that the current excited in the ground plate can be suppressed when the end offset is set to 0.075λ or more in a case where a zeroth-order resonant antenna is provided at a position shifted from the center of the rectangular ground plate. According to the above configuration, since the current excited in the ground plate is suppressed, the current leakage to a communication cable can be reduced.

First Embodiment

Hereinafter, a first embodiment of the present disclosure will be described using the drawings. In the following embodiments, members having the same function will be assigned the same reference numeral, and the descriptions thereof will be omitted. When only a part of a configuration is described, the other parts of the configuration may employ a configuration described in a preceding embodiment.

Figure 2:
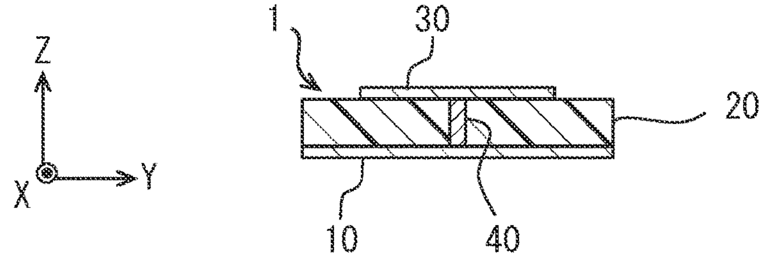
FIG. 2 is a schematic diagram illustrating a cross section taken along a line II-II shown in FIG. 1.

FIG. 1 is an external perspective view showing an example of an outline configuration of a wireless communication device 1 according to the present embodiment. FIG. 2 is a cross sectional view of the wireless communication device 1 along the line II-II illustrated in FIG. 1. The wireless communication device 1 is used while being installed in a moving object such as a vehicle.

The wireless communication device 1 is configured to transmit and receive radio waves of a predetermined target frequency Ft. Of course, as an alternative embodiment, the wireless communication device 1 may be used only for one of transmission or reception. Since transmitting and receiving of radio waves are reversible, a configuration capable of transmitting radio waves of a certain frequency is also a configuration capable of receiving radio waves of the frequency.

In the present embodiment, the target frequency Ft is, for example, 2.45 GHz. Of course, the target frequency Ft may be set appropriately. In another embodiment, the target frequency Ft may be, for example, 300 MHz, 760 MHz, 850 MHz, 900 MHZ, 1.17 GHZ, 1.28 GHZ, 1.55 GHZ, or 5.9 GHZ. The wireless communication device 1 is capable of transmitting and receiving not only radio waves of the target frequency Ft but also radio waves of a frequency within a predetermined range that has been determined with reference to the target frequency Ft. For example, the wireless communication device 1 is configured to be capable of transmitting and receiving radio waves of frequencies belonging to the band from 2400 MHz to 2500 MHz (hereinafter referred to as 2.4 GHz band).

That is, the wireless communication device 1 can transmit and receive radio waves in a frequency band used in short-range wireless communication such as Bluetooth (registered trademark) Low Energy, Wi-Fi (registered trademark), or ZigBee (registered trademark). In other words, the wireless communication device 1 is configured to be able to transmit and receive radio waves in a frequency band (so-called ISM band) specified by the International Telecommunication Union for general use in the industrial, scientific, and medical fields.

Hereinafter, "λ" represents a wavelength of radio waves of the target frequency Ft (hereinafter also referred to as target wavelength). For example, "λ/2" and "0.5λ" indicate a half of the target wavelength, and "λ/4" and "0.25λ" indicate one quarter of the target wavelength. The wavelength (i.e., λ) of radio waves of 2.4 GHz in vacuum and air is 125 mm. In an example of dimensions of members constituting the wireless communication device 1, an expression using λ can be interpreted as an electrical length. The electrical length described herein is an effective length in consideration of a fringing electric field and a wavelength shortening effect caused by a dielectric. The electrical length may also be referred to as the effective length. As a matter of course, for a portion that is not affected by the wavelength shortening effect or the like, λ can be defined as the length in vacuum or air.

The wireless communication device 1 is connected via a communication cable 61 to a communication ECU (i.e., Electronic Control Unit) installed in the vehicle, and signals received by the wireless communication device 1 are sequentially output to the communication ECU. Also, the wireless communication device 1 converts an electric signal input from the communication ECU into radio waves, and radiates the radio waves. The communication ECU uses a signal received by the wireless communication device 1 and inputs a baseband signal to the wireless communication device 1. The baseband signal corresponds to a transmission signal. The communication ECU connected to the wireless communication device 1 can be, for example, a smart ECU that provides a smart entry system. The smart ECU is an ECU that executes control such as locking and unlocking of the vehicle based on a reception status of a signal emitted from a smartphone.

Here, as an example, a case where an AV wire is used as the communication cable 61 connecting the wireless communication device 1 and the communication ECU will be described. AV wire is a low-voltage wire for automobiles, which is realized by sheathing a stranded soft-copper wire with an insulating material such as polyvinyl chloride. "A" in "AV wire" indicates low voltage automotive wire, and "V" indicates vinyl. The AV wire connected to the wireless communication device 1 includes a grounding cable that is an AV wire for providing a ground potential, and a signal cable that is an AV wire through which data signals are transmitted. The connection cable between the wireless communication device 1 and the communication ECU can employ a thin low-voltage wire for automobiles (AVSS cable) or a compressed conductor ultra-thin vinyl chloride insulated low-voltage wire for automobiles (CIVUS cable). "SS" in "AVSS" indicates an ultra-thin type. "C", "I", "V" and "US" in "CIVUS" indicate a compressed conductor type, ISO standards, vinyl, and an ultra-thin wall type, respectively. Of course, a coaxial cable, a feeder line, or the like can be used as the communication cable 61 that connects the wireless communication device 1 and the communication ECU.

Hereinafter, a specific configuration of the wireless communication device 100 will be described. As illustrated in FIG. 1, the wireless communication device 1 includes a ground plate 10, a support portion 20, a counter conductor plate 30, a short circuit portion 40, a control circuit 50, and a connector 60. The support portion 20 is a plate member as will be described later, and the ground plate 10 is formed on one surface of the support portion 20. The counter conductor plate 30 and the control circuit 50 are provided on the other surface of the support portion 20.

For the sake of convenience, each part will be described below assuming that a surface of the ground plate 10 faces upward the counter conductor plate 30 in the wireless communication device 1. That is, a direction from the ground plate 10 toward the counter conductor plate 30 corresponds to an upward direction for the wireless communication device 1. A direction from the counter conductor plate 30 toward the ground plate 10 corresponds to a downward direction for the wireless communication device 1. Hereinafter, the surface of the support portion 20 on which the counter conductor plate 30 is provided also referred to as an antenna formation surface 20A.

The ground plate 10 is a conductive member having a plate shape and made of conductor such as copper. The ground plate 10 is provided along a lower surface of the support portion 20. The plate shape here also includes a thin film shape such as a metal foil. That is, the ground plate 10 may be a circuit trace formed on a surface of a resin plate such as a printed circuit board by electroplating or the like. The ground plate 10 may also be provided as a conductor layer (so-called inner layer) arranged inside a multilayer substrate having conductor layers and insulating layers. The ground plate 10 is electrically connected to the communication cable 61 and provides a ground potential in the wireless communication device 1. The ground plate 10 provides a ground potential for the control circuit 50 described later. Therefore, the ground plate 10 can also be referred to as a circuit ground portion. The ground plate 10 corresponds to a ground portion.

The ground plate 10 is formed in a rectangular shape. An electrical length of a short side of the ground plate 10 is set to 0.2λ, for example. Further, an electrical length of a long side of the ground plate 10 is set to 0.75λ. This shape of the ground plate 10 corresponds to a rectangular shape in which a length of the ground plate 10 in a widthwise direction is set to be shorter than 0.5λ (particularly, 0.25λ) and a length of the ground plate 10 in a lengthwise direction is set to be twice the length in the widthwise direction or more. The length of the ground plate 10 in the lengthwise direction is at least longer than the length of the ground plate 10 in the widthwise direction, and may be 0.6λ, 0.8λ, 1.0λ or 1.5λ, for example. A length ratio of the short side to the long side of the ground plate 10 can be approximately 1:2, 1:3, 1:4, 2:3, or 2:5, for example.

The X-axis shown in the drawings such as FIG. 1 represents the lengthwise direction of the ground plate 10, the Y-axis represents the widthwise direction of the ground plate 10, and the Z-axis represents an up-down direction. The Y-axis direction corresponds to a predetermined direction. The three-dimensional coordinate system including the X-, Y-, and Z-axes is a concept for describing the configuration of the wireless communication device 1.

The ground plate 10 is at least larger than the counter conductor plate 30. The dimensions of the ground plate 10 can be changed as appropriate. Further, a planar shape that is a shape of the ground plate 10 viewed from above may be appropriately changed. The planar shape can also be referred to as a top view shape. In the drawings, as an example, the four corners of the ground plate 10 are formed at right angles, but the corners of the ground plate 10 may be rounded. A part or whole of the edge of the ground plate 10 may have a meander shape. The rectangular shape also includes a rectangular shape having minute projections and recesses on its edge. A slit may be provided in the ground plate 10. The projections and recesses provided on the edge of the ground plate 10 and the slit formed at a position away from the edge of the ground plate 10 can be ignored in design of the external shape of the ground plate 10, as long as they do not affect the operations of the antenna device 1. Here, minute projections and recesses have sizes of about several millimeters.

The support portion 20 is a plate-shaped member and causes the ground plate 10 and the counter conductor plate 30 to be separated by a predetermined distance so as to face each other. The support portion 20 has a rectangular flat plate shape, and a size of the support portion 20 is substantially the same as a size of the ground plate 10 when viewed from above. The support portion 20 is made of a dielectric material having a predetermined relative permittivity. Here, as an example, the support portion 20 is formed by using polytetrafluoroethylene (PTFE) having a relative permittivity of 2.3. When the support portion 20 is formed by using a dielectric material having a relative permittivity of 2.3, the wavelength inside the support portion 20, for example, is about 82 mm due to the wavelength shortening effect of the dielectric material. The material of the support portion 20 may employ various resin materials such as ceramics. For example, the material of the support portion 20 may be a glass epoxy resin (i.e., FR4: Flame Retardant Type 4) having a relative permittivity of about 4.3 to 4.9. Further, the support portion 20 may have a configuration in which multiple types of resin members are combined.

In the present embodiment, as an example, a thickness H of the support portion 20 is 1.5 mm. The thickness H of the support portion 20 corresponds to the distance between the ground plate 10 and the counter conductor plate 30. By adjusting the thickness H of the support portion 20, the distance between the counter conductor plate 30 and the ground plate 10 can be adjusted. The specific value of the thickness H of the support portion 20 may be appropriately determined by simulations or experiments. The thickness H of the support portion 20 may be 1.0 mm, 2.0 mm, 3.0 mm, for example.

The support portion 20 fulfills at least the above-mentioned function, and the shape of the support portion 20 can be changed as appropriate. For example, multiple columns may cause the counter conductor plate 30 and the ground plate 10 to be arranged to face each other. Further, in the present embodiment, a resin as a support portion 20 is filled between the ground plate 10 and the counter conductor plate 30, but alternatively, the present embodiment may not be limited to this. The space between the ground plate 10 and the counter conductor plate 30 may be hollow or vacuum. The support portion 20 may have a honeycomb structure, for example. Furthermore, the exemplary structures described above may be combined with each other as well. When the wireless communication device 1 is provided as a printed circuit board, conductor layers included in the printed wiring board may be used as the ground plate 10 and the counter conductor plate 30, and a resin layer separating the conductor layers may be used as the support portion 20.

The thickness H of the support portion 20 corresponds to the length of the short circuit portion 40 as will be described later. In other words, the thickness H of the support portion 20 functions as a parameter for adjusting an inductance provided by the short circuit portion 40. In addition, the thickness H also functions as a parameter for adjusting a capacitance formed by the ground plate 10 and the counter conductor plate 30 facing each other.

The control circuit 50 is formed on the antenna formation surface 20A in addition to the counter conductor plate 30. The control circuit 50 is disposed in a region shifted from the counter conductor plate 30 in a positive X-axis direction. The control circuit 50 includes, for example, a transceiver circuit and a power supply circuit. The transceiver circuit is a circuit module that performs signal processing related to at least one of signal transmission and signal reception. The transceiver circuit performs at least one of modulation, demodulation, frequency conversion, amplification, digital-to-analog conversion, and detection. The control circuit 50 is an electrical assembly of various parts such as an IC, an analog circuit element, and a connector. The control circuit 50 corresponds to a circuit module.

The control circuit 50 is electrically connected to the counter conductor plate 30 through a feedline 51. The feedline 51 is a microstrip line, for example. The control circuit 50 is also connected to the ground plate 10 through a via or a short-circuit pin, for example. The control circuit 50 is also electrically connected to the AV wire used as the signal cable through the connector 60. That is, the control circuit 50 is connected to the communication ECU via the signal cable. The connector 60 is configured to electrically connect the signal cable or the ground cable to the wireless communication device 1. The connector 60 is disposed, for example, at an end of the ground plate 10 facing in the positive X-axis direction. The installation position of the connector 60 can be appropriately changed, and may be along the short side or the long side of the ground plate 10.

The counter conductor plate 30 is a conductive member having a plate shape and made of conductor such as copper. As described above, the plate shape here also includes a thin film shape such as copper foil. The counter conductor plate 30 is arranged so as to face the ground plate 10 via the support portion 20. Similar to the ground plate 10, the counter conductor plate 30 may also be a circuit trace formed on a surface of a resin plate such as a printed circuit board. In the present disclosure, "parallel" is not limited to a completely parallel state. For example, "parallel" also includes a state inclined about 30 degrees. That is, "parallel" includes a substantially parallel state. The expression "vertical" in the present disclosure is not limited to a completely vertical state, and includes a state inclined at an angle of from several degrees to about 30 degrees.

By arranging the counter conductor plate 30 and the ground plate 10 so as to face each other, a capacitance is generated according to an area of the counter conductor plate 30 and the distance between the counter conductor plate 30 and the ground plate 10. The counter conductor plate 30 has a size so as to generate a capacitance that resonates in parallel with the inductance of the short circuit portion 40 at the target frequency Ft. The area of the counter conductor plate 30 is at least appropriately designed so as to provide a desired capacitance. The desired capacitance is a capacitance that operates at the target frequency Ft in cooperation with the inductance of the short circuit portion 40. When L is the inductance of the short circuit portion 40, and C is the capacitance formed between the counter conductor plate 30 and the ground plate 10, a relational expression of $Ft=1/\{2\pi\sqrt{(LC)}\}$ is established. A person skilled in this art can determine an appropriate area of the counter conductor plate 30 based on the relational expression.

For example, the counter conductor plate 30 is formed in a square shape having a side of an electrical length corresponding to 12 mm. Of course, the length of one side of the counter conductor plate 30 may be changed as appropriate, and may be 14 mm, 15 mm, 20 mm or 25 mm, for example. The planar shape of the counter conductor plate 30 may be a circle, a regular octagon, or a regular hexagon, for example. Further, the counter conductor plate 30 may have a rectangular shape or a long ellipse shape. Note that due to the wavelength shortening effect of the support portion 20, λ inside the support portion 20 and on the surface of the counter conductor plate 30 is about 82 mm. Therefore, 12 mm electrically corresponds to 0.13 for the electric field propagating in the support portion 20.

The counter conductor plate 30 has a feed point 31. The feed point 31 is a portion where the feedline 51 and the counter conductor plate 30 are electrically connected. Here, as an example, the feed point 31 is formed at the center of the edge of the counter conductor plate 30 facing the control circuit 50. This configuration corresponds to a configuration in which the feed point 31 is provided at a position on a straight line passing through the center of the counter conductor plate 30 and parallel to the X-axis in the edge closest to the control circuit 50. The feed point 31 can be arranged at an arbitrary position on the counter conductor plate 30. The feed point 31 is at least located at a position where an impedance matching with the feedline 51 can be obtained. In other words, the feed point 31 is at least provided at a position where a return loss becomes a predetermined allowable level. The feed point 31 may be arranged at an arbitrary position, for example, in a central region or an edge of the counter conductor plate 30. The feed point 31 may be provided at an edge portion parallel to the X axis.

As a method of feeding power to the counter conductor plate 30, various methods such as a direct connection power supply method and an electromagnetic coupling method can be adopted. The direct connection power supply method refers to a method in which the feedline 51 and the counter conductor plate 30 are directly connected. The electromagnetic coupling method refers to a power supply method using electromagnetic coupling between the microstrip line for power supply and the counter conductor plate 30.

The short circuit portion 40 is a conductive member that electrically connects the ground plate 10 and the counter conductor plate 30. It is sufficient that the short circuit portion 40 is provided by using a conductive pin (hereinafter, short-circuit pin). The inductance of the short circuit portion 40 can be adjusted by adjusting a diameter and a length of the short-pin of the short circuit portion 40. The length of the short circuit portion 40, in other words, the thickness H of the support portion 20 may be 0.05λ or less in order to reduce the height of the antenna. Here, as an example, the length of the short circuit portion 40 is set at 0.01λ.

The short circuit portion 40 is at least a linear member having one end electrically connected to the ground plate 10 and the other end electrically connected to the counter conductor plate 30. When the wireless communication device 1 is provided as a printed circuit board as a base material, a via provided in the printed circuit board can be used as the short circuit portion 40.

The short circuit portion 40 is, for example, provided so as to be located at the center of the counter conductor plate 30 (hereinafter, the center of the conductor plate). Therefore, when the length of one side of the counter conductor plate 30 is Lp, a distance La from a connection point of the counter conductor plate 30 with the short circuit portion 40 to the feed point 31 is Lp/2. The position of the short circuit portion 40 may not exactly coincide with the center of the conductor plate 30. The short circuit portion 40 may be deviated by about several millimeters from the center of the conductor plate 30. The short circuit portion 40 may be formed within a central region of the counter conductor plate 30. The central region of the counter conductor plate 30 is a region inside a line connecting points that internally divide line segments from the center to edges in a ratio of 1:5. From another point of view, the central region corresponds to a region of a figure that has a similar shape of and about ⅙ the size of the counter conductor plate 30 and is concentrically overlapped with the counter conductor plate 30.

Position of Counter Conductor Plate 30 Relative to Ground Plate 10

Figure 3:
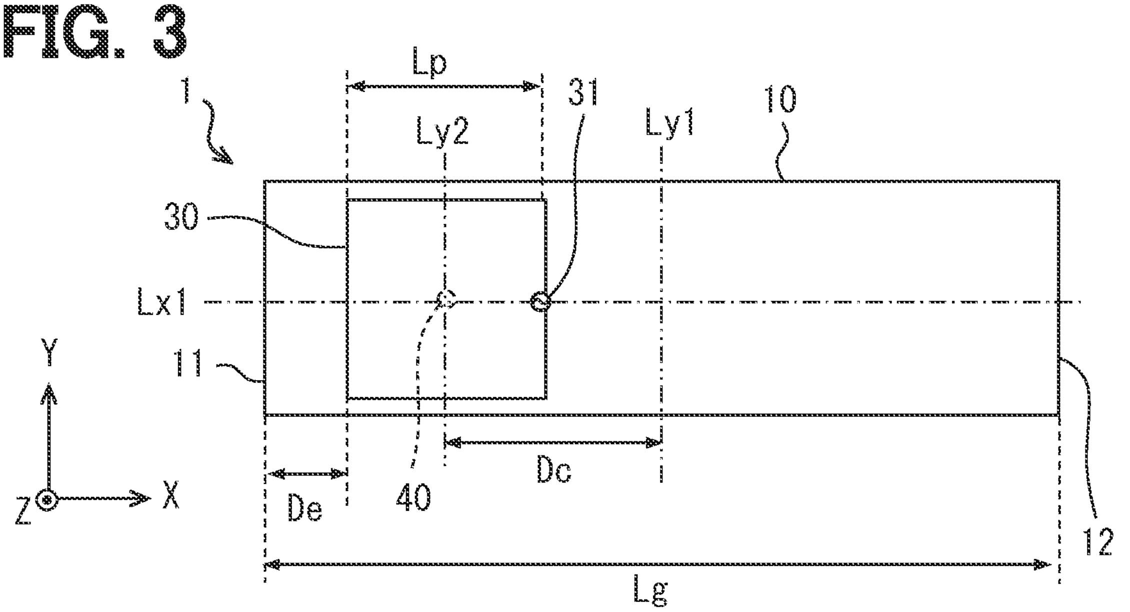
FIG. 3 is a top view of the wireless communication device.

As shown in FIG. 3, the counter conductor plate 30 is disposed to face the ground plate 10 in such a manner that one set of opposite sides of the counter conductor plate 30 is parallel to the X-axis and another set of opposite sides is parallel to the Y-axis. For example, the counter conductor plate 30 is arranged at a position where its center is shifted from the center of the ground plate 10 by a predetermined center offset Dc in a negative X-axis direction. The center offset Dc can be, 0.125λ, 0.25λ or 0.5λ, for example.

Lp in FIG. 3 represents the length of one side of the counter conductor plate 30, in other words, the length in the X-axis direction. De indicates an end offset which is a distance between an antenna near end 11 and the end of the counter conductor plate 30 facing in the negative X-axis direction in the top view.

The center offset Dc can be appropriately changed within a range without the counter conductor plate 30 extending outward of the ground plate 10 when viewed from above. The counter conductor plate 30 is arranged so that at least the entire region (i.e., entire surface) of the counter conductor plate 30 faces the ground plate 10. The center offset Dc corresponds to an amount of deviation of the center of the counter conductor plate 30 from the center of the ground plate 10. As will be described later, the center offset Dc may be set such that the end offset De is 0.075λ or more. As another aspect, the counter conductor plate 30 may be disposed along the end of the ground plate 10 facing in the negative X-axis direction (the left end in FIG. 3). The end offset De may be zero.

Hereinafter, for the sake of convenience, one of two ends of the ground plate 10 in the lengthwise direction facing in the negative X-axis direction is referred to as the antenna near end 11. The antenna near end 11 corresponds to an end of the ground plate 10 that is relatively near to the counter conductor plate 30 among the two ends of the ground plate 10 in the lengthwise direction. The other of the two ends of the ground plate 10 opposite to the antenna near end 11 in the lengthwise direction is referred to as an antenna far end 12. The antenna far end 12 corresponds to an end of the ground plate 10 that is relatively far from the counter conductor plate 30 among the two ends of the ground plate 10 in the lengthwise direction.

In FIG. 3, the support portion 20 and the control circuit 50 are transparent in order to clarify the positional relationship between the ground plate 10 and the counter conductor plate 30. That is, illustrations of the support portion 20 and the control circuit 50 are omitted in FIG. 3. The alternate long and short dash line Lx1 shown in FIG. 3 represents a straight line passing through the center of the ground plate 10 and parallel to the X-axis, and the alternate long and two short dash line Ly1 represents a straight line passing through the center of the ground plate 10 and parallel to the Y-axis. The alternate long and two short dash line Ly2 represents a straight line that passes through the center of the counter conductor plate 30 and is parallel to the Y-axis. From another point of view, the straight line Lx1 corresponds to the axis of symmetry for the ground plate 10 and the counter conductor plate 30. The straight line Ly1 corresponds to the axis of symmetry for the ground plate 10. The straight line Ly2 corresponds to the axis of symmetry for the counter conductor plate 30. The alternate long and short dash line Lx1 also passes through the center of the counter conductor plate 30. That is, the alternate long and short dash line Lx1 corresponds a straight line parallel to the X-axis and passing through the center of the ground plate 10 and the center of the counter conductor plate 30. The intersection of the straight line Lx1 and the straight line Ly1 corresponds to the center of the ground plate 10, and the intersection of the straight line Lx1 and the straight line Ly2 corresponds to the center of the counter conductor plate 30 (hereinafter referred to as conductive plate center). The conductive plate center corresponds to the center of gravity of the counter conductor plate 30. Since the counter conductor plate 30 has the square shape in the present embodiment, the conductive plate center corresponds to an intersection of two diagonal lines of the counter conductor plate 30. When the ground plate 10 and the counter conductor plate 30 are arranged to be concentric, the center of the counter conductor plate 30 and the center of the ground plate 10 overlap in top view.

Operation Principle of Wireless Communication Device 1

Here, the operation of the wireless communication device 1 will be described. In the wireless communication device 1, the counter conductor plate 30 is short-circuited to the ground plate 10 by the short circuit portion 40 provided in the center region of the counter conductor plate 30, and the area of the counter conductor plate 30 is set to cause an electrostatic capacitance that resonates in parallel with the inductance of the short circuit portion 40 at the target frequency Ft.

Therefore, when a high-frequency signal is input from the control circuit 50, an LC parallel resonance occurs due to an energy exchange between the inductance and the capacitance, and a vertical electric field perpendicular to the ground plate 10 and the counter conductor plate 30 is generated between the ground plate 10 and the counter conductor plate 30. This vertical electric field propagates from the short circuit portion 40 toward the edge of the counter conductor plate 30. Then, at the edge of the counter conductor plate 30, the vertical electric field becomes a ground-plate vertically-polarized wave that is a linearly polarized wave having a polarization plane perpendicular to the ground plate 10, and propagates through space. That is, a structure including the short circuit portion 40 and the counter conductor plate 30 functions as a zeroth-order resonant antenna element ANT. The ground-plate vertically-polarized wave here is radio waves in which the vibration direction of the electric field is perpendicular to the ground plate 10 and the counter conductor plate 30.

This wireless communication device 1 has directivity in an antenna horizontal direction at the target frequency Ft. The antenna horizontal direction here is a direction from the center of the counter conductor plate 30 toward the edge thereof. According to another aspect, the antenna horizontal direction is orthogonal to the short circuit portion 40. The antenna horizontal direction corresponds to a lateral direction of the wireless communication device 1. When the ground plate 50 is disposed so as to be horizontal, the wireless communication device 1 functions as an antenna having a main beam in the horizontal direction.

The operation for transmitting (i.e. radiating) radio waves and the operation for receiving radio waves are mutually reversible in the wireless communication device 1. That is, the wireless communication device 1 is capable of receiving the ground-plate vertically-polarized wave coming in the antenna horizontal direction.

Condition in which Ground Plate 10 Causes Secondary Resonance

Figure 4:
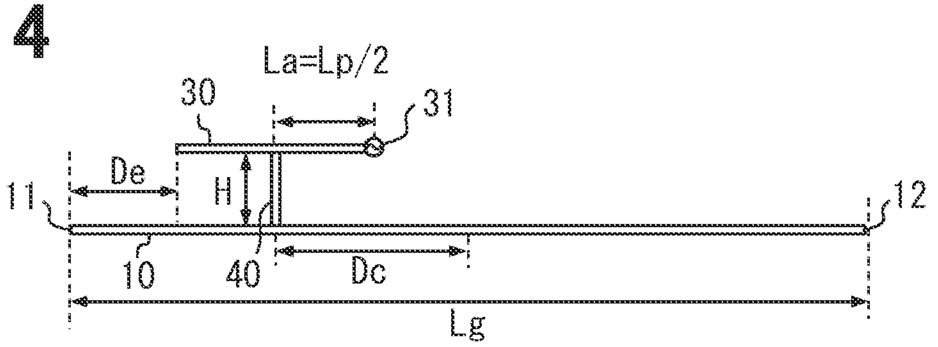
FIG. 4 is a diagram for explaining conditions under which a ground plate is excited.
Figure 5:
FIG. 5 is a diagram for explaining a current distribution at the time of ground plate resonance.

Here, FIGS. 4 and 5 will be described with respect to a condition in which the ground plate 10 causes secondary resonance in association with excitation of the zeroth-order resonant antenna element ANT. FIGS. 4 to 5 are diagrams conceptually illustrating a positional relationship among the ground plate 10, the counter conductor plate 30, and the short circuit portion 40 in a cross section parallel to the X-Z plane passing through the straight line Lx1 in FIG. 3. In FIG. 4, La represents the distance from the feed point 31 to the short circuit portion 40, and H represents the height of the support portion 20, in other words, the thickness of the support portion 20. The ground plate length Lg and the end offset De are as described above. La in the present disclosure corresponds to Lp/2. In addition, there is a relationship of $De=Lg/2-Dc-Lp/2$. In FIGS. 4 to 5, the thickness H of the support portion 20 is shown in an exaggerated manner. H is a value sufficiently and negligibly smaller than Lg.

As described above, the configuration including the counter conductor plate 30 and the short circuit portion 40 in the present disclosure operates as a zeroth-order resonant antenna according to the high-frequency signal input from the feed point 31. In this operation, the current input from the feed point 31 flows to the ground plate 10 through the short circuit portion 40 as shown in FIG. 5. According to simulations, it has been confirmed that a current flowing through the ground plate 10 due to the LC parallel resonance flows from the short circuit portion 40 toward the edges of the respective sides of the ground plate 10. The current that has flowed into the ground plate 10 from the counter conductor plate 30 through the short circuit portion 40 mainly flows from the short circuit portion 40 toward both sides of the ground plate 10 in the lengthwise direction. That is, the current flowing through the ground plate 10 can flow from the short circuit portion 40 toward each of the antenna near end 11 and the antenna far end 12.

Here, when the ground plate length Lg is $\lambda/4\times N$ (N: integer), the ground plate 10 is excited to radiate an unnecessary radio waves or increase a leakage current. For convenience, the resonance derived from the current flowing through the ground plate 10 is also referred to as ground plate resonance. That is, when the relationship of $Lg=\lambda/4\times N$ is satisfied, the ground plate resonance occurs. This condition is referred to as a ground plate resonance condition.

In addition, paradoxically, when the ground plate length Lg is set so as not to satisfy the relationship of $Lg=\lambda/4\times N$, the leakage current due to the ground plate resonance can be reduced. For example, by setting the ground plate length Lg at a value that satisfies the non-resonance condition expressed by the following relational expression, the current leakage to the communication cable 61 can be reduced.

$$Lg=\lambda/4\times N+\alpha(0.025\lambda\leq\alpha\leq0.225\lambda)$$

The range of a is a parameter for modifying the current distribution between the feed point 31 and the antenna far end 12 such that the current distribution does not become resonance distribution causing the ground plate resonance. When a is too small, resonance cannot be broken. The specific value range of a is specified by simulation. For example, a can be 0.05λ, 0.1λ, 0.125λ, 0.15λ, or 0.2λ. α may be a preset value. N can be a value satisfying λ/4×(N−1)≤Lg≤λ/4×N based on the ground plate length Lg. Based on the above, it is assumed that the ground plate length Lg of the present disclosure is set at a value satisfying λ/4×N+α.

Effects of the Present Disclosure

Here, effects of the proposed configuration according to the present disclosure will be described using a comparative configuration. The details of the comparative configuration and the proposed configuration are as follows. The comparative configuration includes a square counter conductor plate 30, and a ground plate length Lg is set to 82 mm. Since A on surfaces of various conductors is 82 mm due to the wavelength shortening effect of a support portion 20, the ground plate length Lg of the comparative configuration approximately matches λ/4×4=1λ. That is, the comparative configuration corresponds to a configuration that satisfies the ground plate resonance condition. A case where the ground plate length Lg differs from the length satisfying λ/4×N by about 0.02λ can also be included in the case where the ground plate resonance condition is satisfied. In other words, a described above corresponds to the likelihood in design for not causing the ground plate resonance.

On the other hand, in the proposed configuration, the ground plate length Lg is set to 90 mm. That is, the ground plate length Lg in the proposed configuration is set to a value deviated by about 8 mm from 82 mm that satisfies the resonance condition. Here, the end offset De is set to 8 mm. The proposed configuration corresponds to a configuration in which the ground plate length Lg is set so as to satisfy the non-resonance condition.

Figure 6:
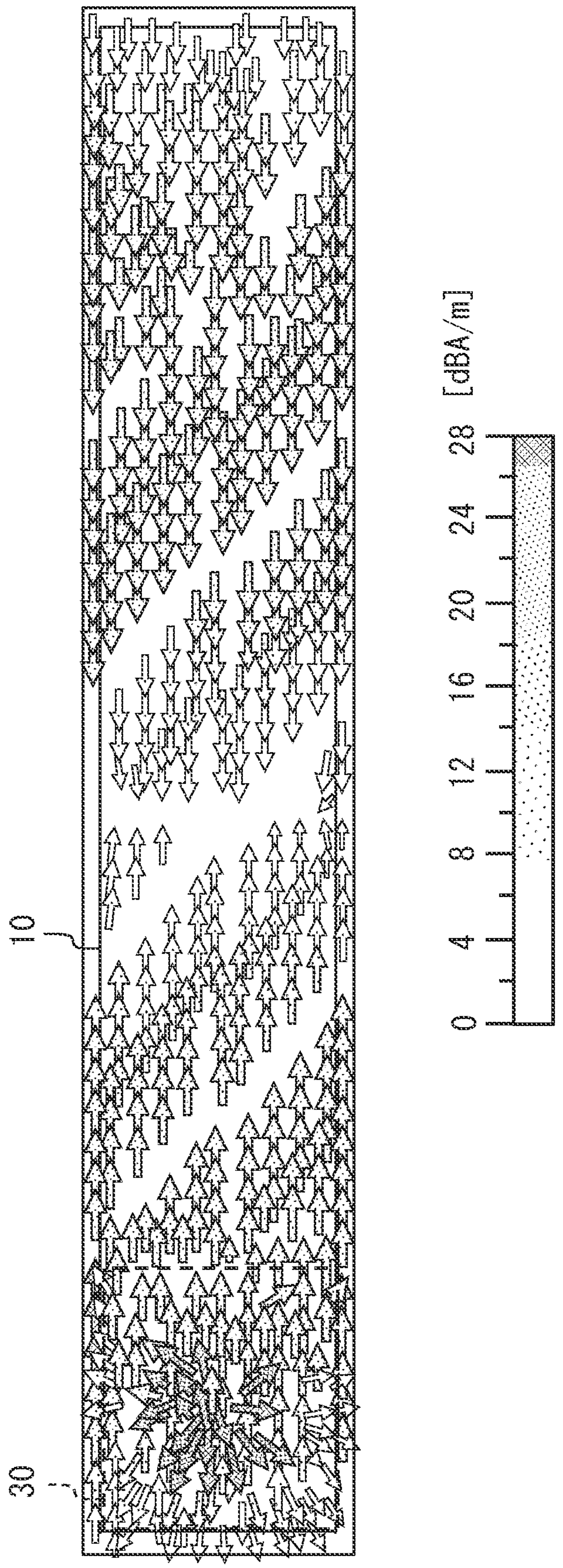
FIG. 6 is a diagram illustrating a result of simulating a current distribution at the time of LC parallel resonance in a comparative configuration.
Figure 7:
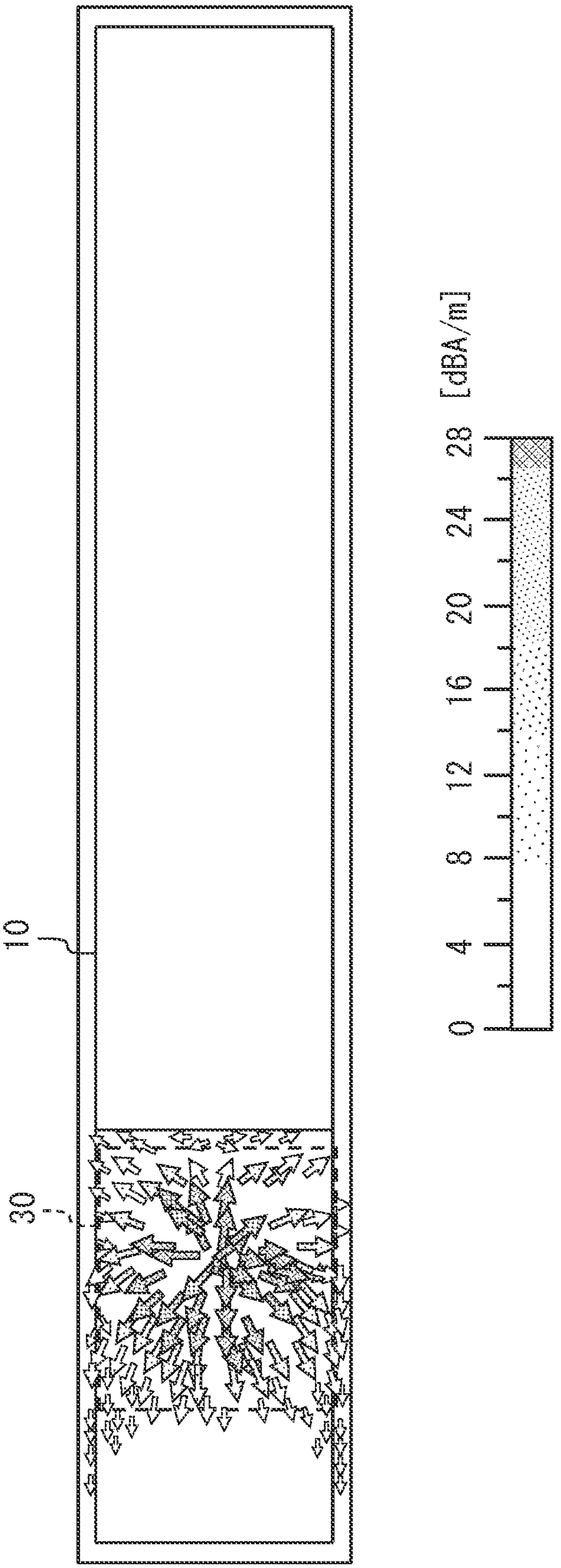
FIG. 7 is a diagram illustrating a result of simulating a current distribution at the time of LC parallel resonance in a proposed configuration.

FIGS. 6 and 7 are diagrams illustrating the results of analyzing distribution of current flowing through the ground plate 10 depending on whether the non-resonance condition is satisfied. Specifically, FIG. 6 shows the current distribution in the comparative configuration, and FIG. 7 shows the current distribution in the proposed configuration.

As shown in FIG. 6, in the comparative configuration, the current is distributed such that anti-nodes and nodes are alternately generated every λ/4 up to the antenna far end 12. The ground plate resonance can be seen. The resonance current can distribute such that the antenna far end 12 becomes a node of the resonance current. On the other hand, in the proposed configuration, as shown in FIG. 7, the range of the current flowing in the ground plate 10 is substantially limited within a region related to the zeroth order resonance, that is, a portion facing the counter conductor plate 30. The ground plate resonance cannot be seen. The average value of the surface current of the ground plate 10 in the comparative configuration was 22.0 dBA/m, whereas the average value of the surface current of the ground plate 10 in the proposed configuration was −1.8 dBA/m. That is, according to the proposed configuration, the average value of the surface current of the ground plate 10 can be reduced by about 23.8 dB.

Figure 8:
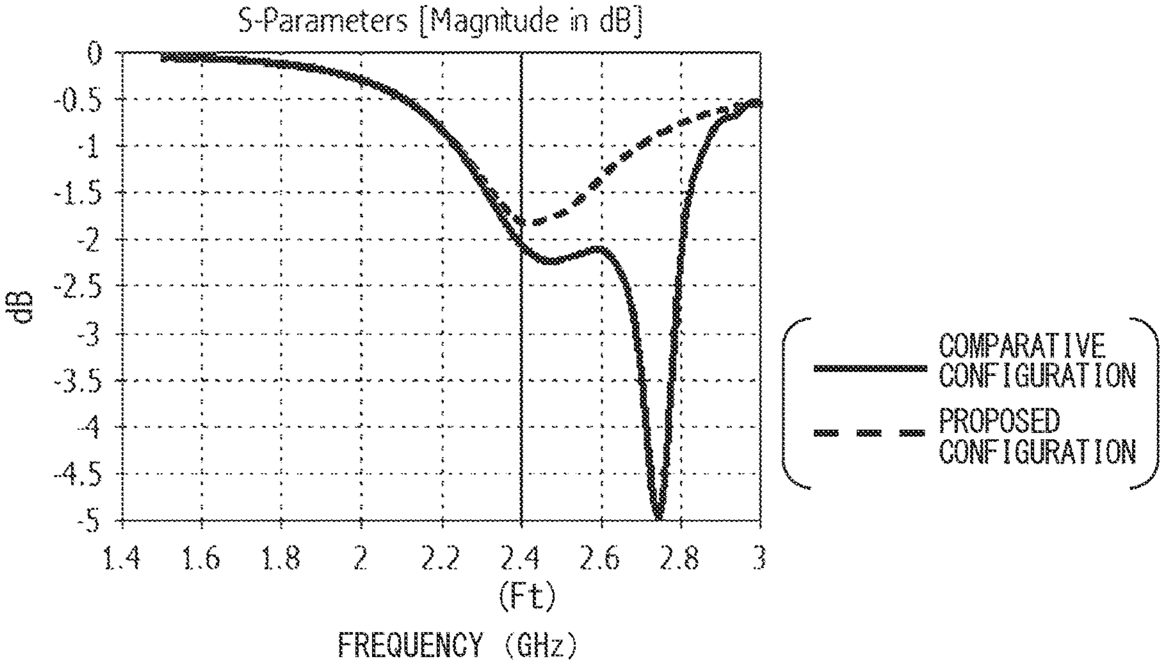
FIG. 8 is a diagram illustrating reflection characteristics for each frequency of the comparative configuration and the proposed configuration.

FIG. 8 shows a result of simulating S parameters (reflection characteristics) in the comparative configuration and the proposed configuration. As shown by the simulation results of the reflection characteristics in FIG. 8, in the comparative configuration, resonance can be seen at around 2.7 GHZ in addition to the LC resonance (in other words, the zeroth order resonance) at around 2.4 GHz which is the target frequency. The resonance at around 2.7 GHZ corresponds to the ground plate resonance. On the other hand, in the proposed configuration, the reflection characteristic indicating an occurrence of the ground plate resonance is not observed in the region around the target frequency. According to the proposed configuration, the likelihood of occurrence of the ground plate resonance in the region around the target frequency can be reduced. As a result, the current leakage to the communication cable 61 can be reduced. Here, the region around the target frequency indicates, for example, a range within ±0.4 GHz from the target frequency.

As another configuration for reducing the current leakage to the communication cable 61, it can be assumed that a circuit element such as a low-pass filter or a high-pass filter is provided at a connection portion with the communication cable 61. However, in this assumed configuration, the cost increases by an amount corresponding to the element or circuit traces functioning as the filter circuit. With respect to such a problem, according to the configuration of the present disclosure, there is an advantage that the current leakage to the communication cable 61 can be reduced while decreasing the cost.

Example of Attachment of Wireless Communication Device 1 to Vehicle

Figure 9:
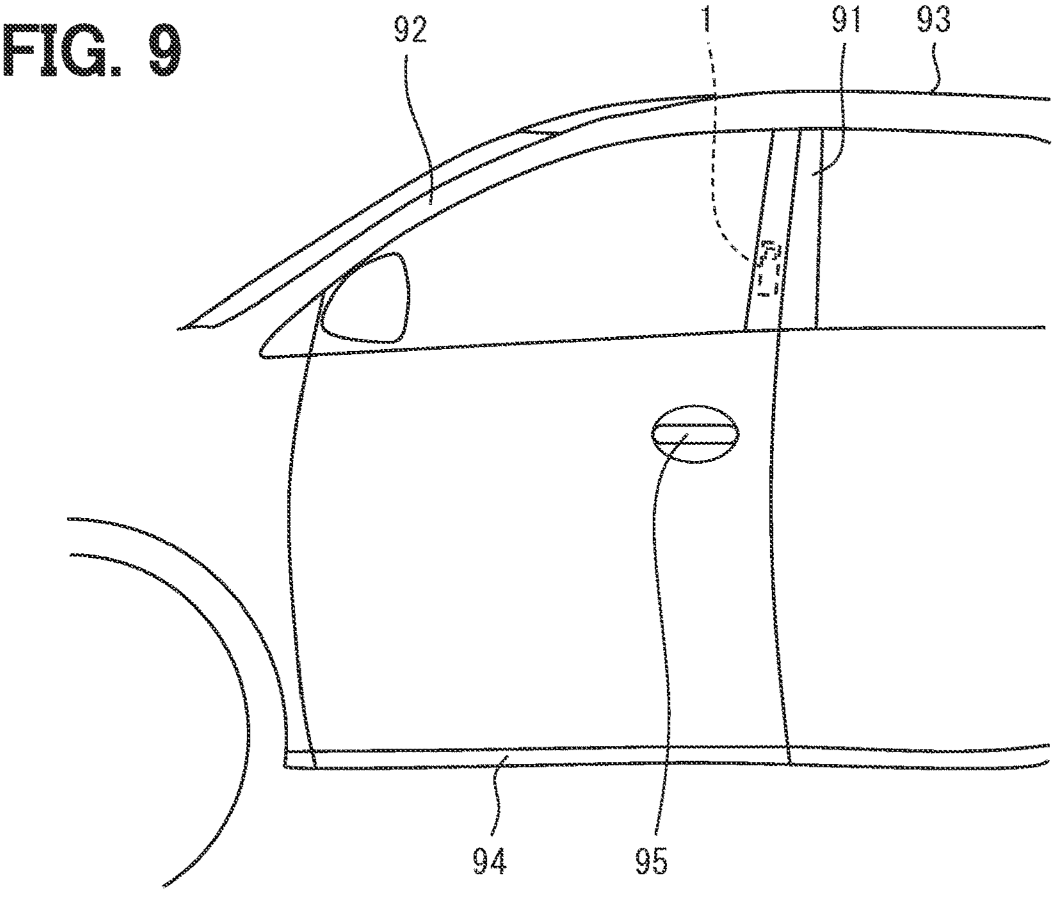
FIG. 9 is a diagram illustrating an example in which the wireless communication device is mounted on a vehicle.

For example, as illustrated in FIG. 9, the wireless communication device 1 described above can be used while being attached to an outer surface of a B pillar 91 of the vehicle on an outer side of the vehicle compartment. The wireless communication device 1 is oriented such that the upper direction of the wireless communication device 1 match a direction outward from the vehicle compartment. More specifically, the ground plate 10 faces the outer surface of the B pillar 91 and is oriented such that the X-axis direction is along a lengthwise direction of the B pillar 91 (i.e., vehicle height direction). The wireless communication device 1 may be attached to a portion overlapping with the B-pillar 91 inside a door panel in the above-described orientation.

According to the above attachment orientation, a positive Z-axis direction, which is an upward direction of the wireless communication device 1, roughly corresponds to a width direction of the vehicle, and the antenna horizontal direction is along (i.e., parallel to) a lateral surface of the vehicle. According to this attachment orientation, it is possible to form a communication area along the lateral surface of the vehicle.

The attachment position and attachment orientation of the wireless communication device 1 may not be limited to the above examples. The wireless communication device 1 may be attached to an arbitrary position on the outer surface of the vehicle, such as an outer surface of an A-pillar 92 or an outer surface of a C-pillar, a rocker portion (i.e., side sill) 94, or an inside or vicinity of an outer door handle 95. For example, the wireless communication device 1 may be housed inside the outer door handle 95 such that the X-axis direction is along a lengthwise direction of the handle and the Y-axis direction is along the vehicle height direction. Also, the wireless communication device 1 may be installed in a roof portion 93.

Although the embodiment of the present disclosure has been described above, the present disclosure is not limited to the above-mentioned embodiment, and various supplements and modifications described below are also included in the technical scope of the present disclosure. Furthermore, in addition to the following, various changes can be made within the range without departing from the scope of the present disclosure. For example, the various modifications to be described below can be implemented in appropriate combination within a scope that does not cause technical inconsistency.

Supplement to Attachment Position of Connector 60

Figure 10:
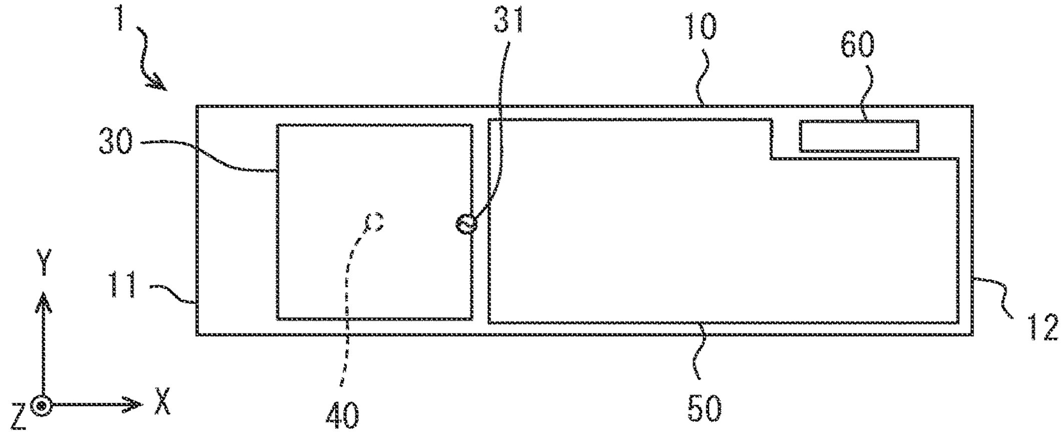
FIG. 10 is a diagram illustrating a modification of an installation position of a connector.

Although the example in which the connector 60 is provided at and along the antenna far end 12 has been described above, the present disclosure is not limited thereto. For example, as illustrated in FIG. 10, the connector 60 may be provided at a position and in an orientation along an edge of the support portion 20 facing in the positive Y-axis direction or negative Y-axis direction.

Figure 11:
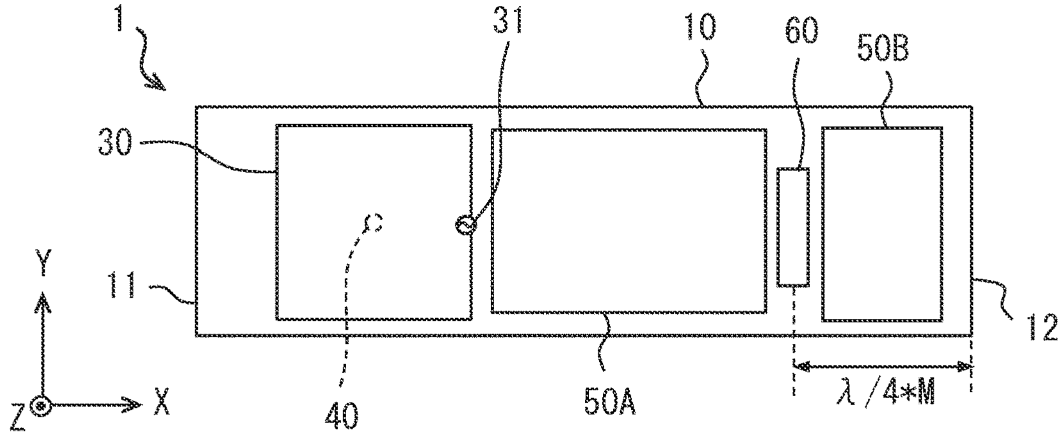
FIG. 11 is a diagram illustrating a modification of an installation position of the connector.

As shown in FIG. 11, the connector 60 may be provided at a position separated from the antenna far end 12 by M times (M: odd number) of λ/4. In FIG. 11, reference numeral 50A denotes a transceiver circuit that performs modulation and demodulation and reference numeral 50B denotes a power supply circuit, for example. Of course, the contents of the circuits indicated by 50A and 50B can be appropriately changed. The control circuit 50 may be divided into multiple blocks as illustrated in FIG. 11.

When the ground plate 10 is formed using an inner layer of a multilayer substrate, a part of the control circuit 50 may be formed on a substrate surface (hereinafter referred to as back substrate surface) located further below the ground plate 10. When the wireless communication device 1 is formed by using a multilayer substrate including multiple conductor layers, the antenna formation surface 20A corresponds to a front substrate surface of the multilayer substrate. For example, the transceiver circuit 50A may be formed on the front substrate surface serving as the antenna formation surface 20A, and the power supply circuit 50B may be formed on the back substrate surface. The control circuit 50 may be divided and provided on the front and back sides of the substrate. Note that if a circuit is formed not only on the front substrate surface but also on the back substrate surface, the height of the wireless communication device 1 can be increased because electronic components such as capacitors and IC chips have a certain height. Regarding such a problem, according to a configuration in which most or all of the control circuit 50 is provided on the antenna formation surface 20A, the height of the wireless communication device 1 can be further reduced. In the above configuration, a configuration before mounting the control circuit 50, in other words, a configuration obtained by removing the control circuit 50 from the above configuration corresponds to an antenna module.

Supplement to Shape and Position of Counter Conductor Plate 30 Relative to Ground Plate 10

Figure 12:
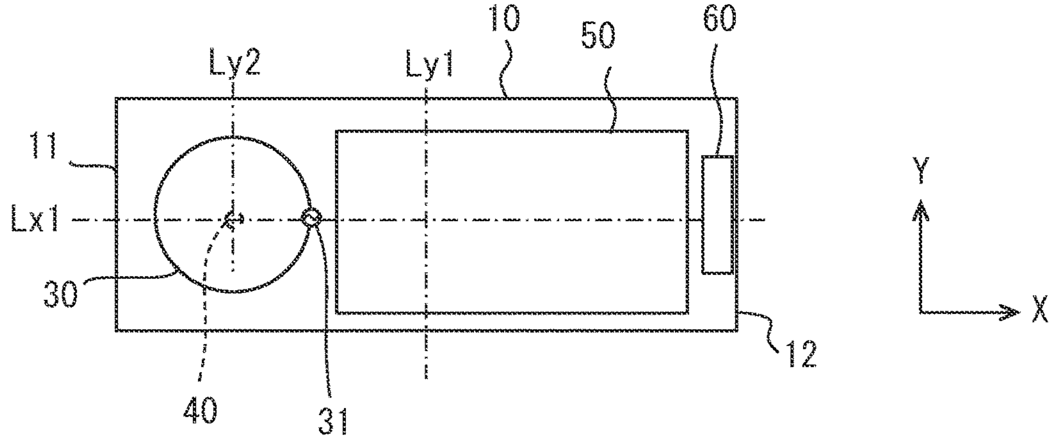
FIG. 12 is a diagram illustrating a modification of a shape of a counter conductor plate.

The counter conductor plate 30 may have slits, and the counter conductor plate 30 may have rounded corners. For example, a notch as a degeneracy separation element may be provided at a pair of corner portions diagonally facing each other. A part or whole of the edge of the counter conductor plate 30 may have a meander shape. Projections and recesses that are provided at the edge of the counter conductor plate 30 and do not affect the operations of the wireless communication device 1 can be ignored. The counter conductor plate 30 may have a circular shape as shown in FIG. 12.

Figure 13:
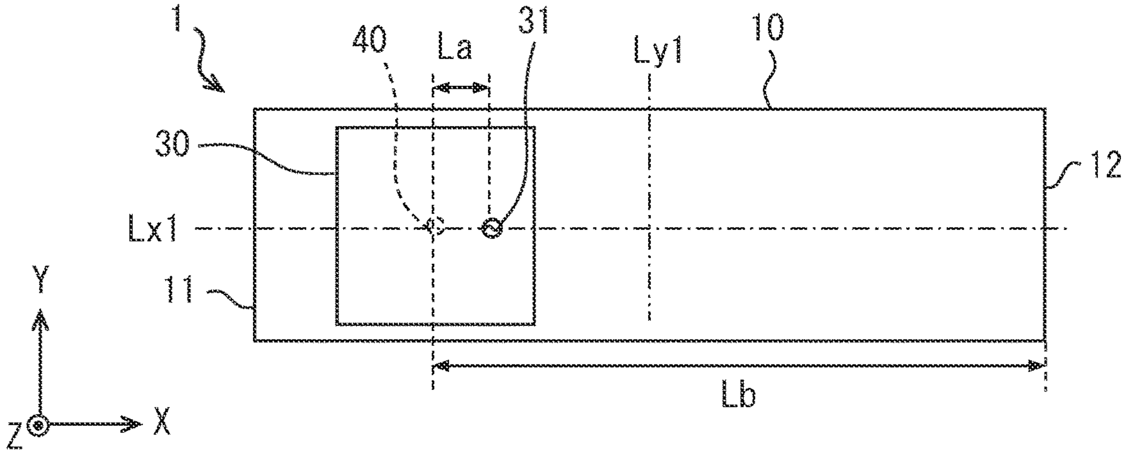
FIG. 13 is a diagram illustrating a modification of a formation position of a feeding point.

Further, the position of the feed point 31 is not necessarily limited to the edge of the counter conductor plate 30. For example, as shown in FIG. 13, the feed point 31 may be formed at a position away from the edge of the counter conductor plate 30. FIG. 13 discloses an aspect in which the feed point 31 is provided on the long axis Lx1 of the ground plate 10, but the present disclosure is not limited thereto. The feed point 31 may be provided at a position deviated from the long axis Lx1 of the ground plate 10.

First Modification

Figure 14:
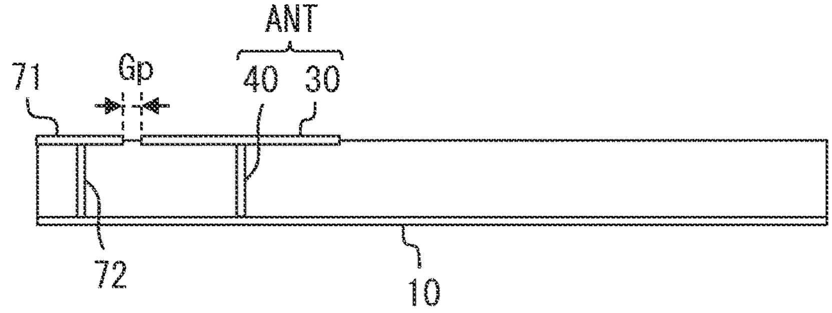
FIG. 14 is a diagram illustrating a configuration in which an additional conductor is provided in the vicinity of the counter conductor plate.

A circuit element or the like may be disposed in a space generated by disposing the zeroth-order resonant antenna element ANT including the counter conductor plate 30 and the short circuit portion 40 away from the end of the ground plate 10 facing in the lengthwise direction. As shown in FIG. 14, an additional conductor 71 may be disposed in the space. The additional conductor 71 is electrically connected to the ground plate 10 via a short-circuit pin 72. The additional conductor 71 is a conductor member having a plate shape. The additional conductor 71 is disposed on the antenna formation surface 20A that is shifted from the counter conductor plate 30 in the negative X-axis direction. The additional conductor 71 is separated from the counter conductor plate 30 by a predetermined gap Gp and opposed to the counter conductor plate 30. The short-circuit pin 72, for example, can employ a via or the like formed in a circuit board. The additional conductor 71 may be a conductor having a circuit trace or may be realized by using a land.

According to this configuration, a capacitance component contributing to the LC parallel resonance is increased by a capacitance corresponding to the gap Gp between the additional conductor 71 and the counter conductor plate 30. As a result, the size of the counter conductor plate 30 can be further reduced. The gap Gp between the counter conductor plate 30 and the additional conductor 71 is set to a value such that the counter conductor plate 30 and the additional conductor 71 are not electromagnetically coupled. For example, the gap Gp is preferably set to/100 or more.

Figure 15:
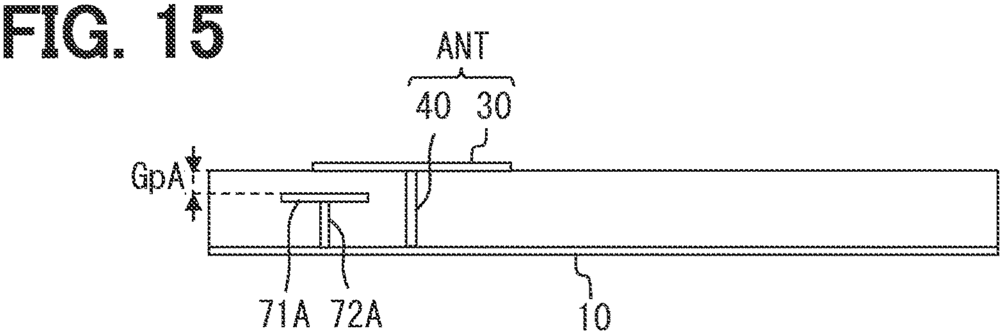
FIG. 15 is a diagram illustrating a configuration in which an internal additional conductor is provided in the vicinity of the counter conductor plate.

In addition, as shown in FIG. 15, an internal additional conductor 71A, which is a conductor plate parallel to the counter conductor plate 30 and the ground plate 10, may be formed between them. The internal additional conductor 71A is electrically connected to the ground plate 10 using the short-circuit pin 72A. When the wireless communication device 1 is provided by using a multilayer substrate, the internal additional conductor 71A can be an internal conductor layer of the multilayer substrate. The short-circuit pin 72 can be a via. The concept of the via here can include a through-hole via that penetrates all the layers of the substrate, an interstitial (inner) via that connects some layers, a blind via, and a buried via that connects inner layers, for example.

According to the configuration illustrated in FIG. 15, the capacitance component contributing to the LC parallel resonance increases in accordance with a gap GpA between the internal additional conductor 71A and the counter conductor plate 30 and an area of a portion where the internal additional conductor 71A and the counter conductor plate 30 overlap each other in the top view. Therefore, also with the above configuration, the area of the counter conductor plate 30 can be reduced.

Second Modification

The ground plate length Lg is a value appropriately determined in consideration of mountability to the vehicle and a space required for the control circuit 50. Therefore, it may be difficult to set the ground plate length Lg to an appropriate length that satisfies the non-resonance condition for the ground plate 10. In addition, when the ground plate length Lg is increased in one direction, in other words, in the same plane, the volume of the wireless communication device 1 increases, and the mountability of the wireless communication device 1 to the vehicle deteriorates. In addition, when the ground plate length Lg is shortened, an area necessary for the control circuit 50 may not be secured.

Figure 16:
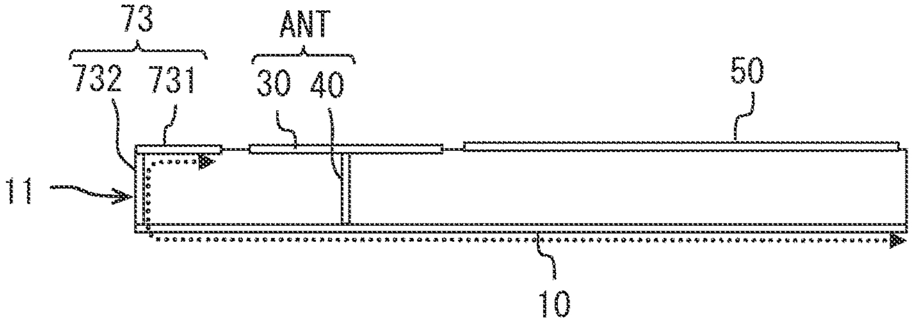
FIG. 16 is a diagram illustrating a configuration in which a folded portion is provided at an antenna near end.

Based on such circumstances, for example, as illustrated in FIG. 16, a folded portion 73 that plays a role of extending the ground plate length Lg may be formed at the antenna near end 11.

The folded portion 73 includes a ground plate extension portion 731 and a bridge portion 732. The ground plate extension portion 731 is a conductor having flat plate shape and is formed on the antenna formation surface 20A adjacent to the antenna near end 11. The bridge portion 732 connects the ground plate extension portion 731 and the ground plate 10 in the vicinity of the antenna near end 11.

According to this configuration, the current that has reached the antenna near end of the ground plate 10 flows toward an end of the ground plate extension portion 731 facing in the positive X-axis direction via the bridge portion 732. That is, a path length of current flowing from the short circuit portion 40 into the ground plate 10 can be substantially extended. Therefore, the length of the ground plate 10 in the X-axis direction can be reduced. For example, even in a case where it is difficult to secure a desired ground plate length Lg due to circumstances such as a mounting space in the vehicle, the substantial ground plate length Lg can satisfy the non-resonance condition by providing the folded portion 73. That is, the occurrence of the ground plate resonance around the target frequency can be reduced without changing the ground plate length Lg in the top view. In the above configuration, the end of the ground plate extension portion 731 facing in the positive X-axis direction corresponds to an actual end of the ground plate 10 facing in the lengthwise direction. In one aspect, the ground plate extension portion 731 and the bridge portion 732 can also be regarded as a part of the ground plate 10.

Figure 17:
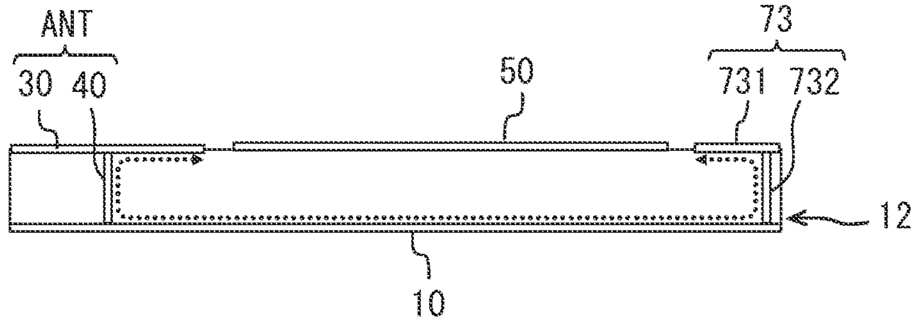
FIG. 17 is a diagram illustrating a configuration in which a folded portion is provided at an antenna far end.

Further, as shown in FIG. 17, a folded portion 73 that extends the ground plate length Lg may be formed at or near the antenna far end 12. In this case, a bridge portion 732 connects a ground plate extension portion 731 and the ground plate 10 in the vicinity of the antenna far end 12. In the above configuration, the end of the ground plate extension portion 731 facing in the negative X-axis direction corresponds to the actual end of the ground plate 10 facing in the lengthwise direction. Hereinafter, for convenience, a length of the folded portion 73, in other words, a path length of current extended by the folded portion 73 is referred to as a folded length. If the ground plate length Lg is set to an integer multiple of λ/4, the folded length may be set to 0.025λ or more.

The density of the current flowing through the ground plate 10 becomes higher in a direction toward the short circuit portion 40. In addition, the current density is low at the antenna far end 12. That is, the current density is higher at the antenna near end 11 than at the antenna far end 12. Therefore, when the folded length is constant, the resonance suppression effect tends to be higher in the configuration in which the folded portion 73 is provided at or near the antenna near end 11 than in the configuration in which the folded portion 73 is provided at or near the antenna far end 12. That is, when the length of the ground plate 10 is an integer multiple of λ/4, the required folded length can be smaller when the folded portion 73 is provided at or near the antenna near end 11 than when the folded portion 73 is provided at or near the antenna far end 12. This is because the current attenuation amount per unit length is different.

Figure 18:
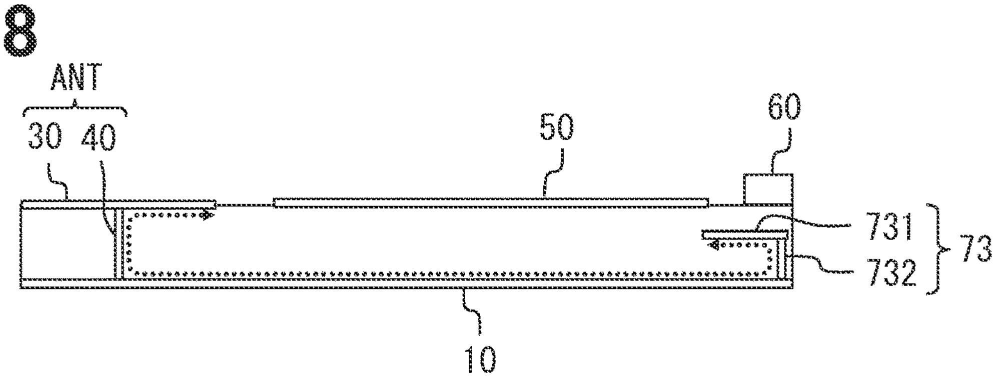
FIG. 18 is a view illustrating a configuration in which a folded portion is formed inside a support portion.

Although FIGS. 16 and 17 disclose an aspect in which the ground plate extension portion 731 is formed on the antenna formation surface 20A, in other words, in the same layer as the counter conductor plate 30, the present disclosure is not limited thereto. For example, as illustrated in FIG. 18, the ground plate extension portion 731 may be formed below the counter conductor plate 30, in other words, inside the support portion 20. For example, the ground plate extension portion 731 can be an inner conductor layer of a multilayer substrate. The bridge portion 732 can be a via. According to this configuration, the connector 60 can be installed at the end of the antenna formation surface 20A facing in the positive X-axis direction.

Second Embodiment

The first embodiment described above is based on the finding that the ground plate 10 is likely to cause resonance when the ground plate length Lg is an integer multiple of λ/4. However, the configuration capable of avoiding or suppressing the resonance caused by the ground plate 10 is not limited to the above embodiment. As a result of the study conducted by the inventors, it has also been found that when the end offset De is 0.075λ or more, the ground plate 10 does not cause resonance, or current leakage from the ground plate 10 can fall within an allowable level even if the ground plate length Lg is an integer multiple of λ/4. The wireless communication device 1 according to the second embodiment is based on this new finding. In a wireless communication device 1 of the second embodiment, the end offset De illustrated in FIG. 4 is set to 0.075λ or more.

Since the zeroth-order resonant antenna element ANT is disposed at a position shifted in the lengthwise direction from the center of the ground plate 10 as a premise, the upper limit value of the end offset De is Lg/2−Lp/2. That is, the end offset De is set to 0.075λ or more and less than Lg/2−Lp/2.

According to this configuration, even if the ground plate length Lg corresponds to an integer multiple of λ/4, an increase in current leakage to the communication cable 61 due to excitation of the ground plate 10 can be suppressed. Further, as described above, the effective length of A in the ground plate 10 is shortened by the resin material in contact with the ground plate 10. If multiple types of resin members are provided around the ground plate 10, it is difficult to specify an accurate effective length because the wavelength shortening effects of the multiple resin materials act in a composite manner. That is, when there are multiple types of resin members having different relative permittivities around the ground plate 10, it is difficult to accurately specify λ/4. As a result, it is difficult to adjust the dimension of the ground plate 10 based on λ/4 as in the above-described first embodiment.

In response to the difficulty, according to the configuration of the second embodiment, it is sufficient that the end offset De is 0.075λ or more. The end offset De may be 0.1λ or more. Even if some error is included in the estimated value of the effective length of A, the difficulty can be easily overcome. For example, the non-resonance condition can be satisfied by setting the end offset De to be larger than the estimated value of 0.075λ. That is, according to the configuration of the second embodiment, it is possible to suppress the occurrence of the ground plate resonance based on the approximate value of A. As described above, according to the second embodiment, it is possible to suppress the current leakage to the communication cable 61 while reducing the manufacturing difficulty as compared with the first embodiment. Note that the various supplementary descriptions of the first embodiment and the configurations described above as the first and second modifications of the first embodiment can be applied to the second embodiment.

Supplement to Overall Configuration of Wireless Communication Device 1

Figure 19:
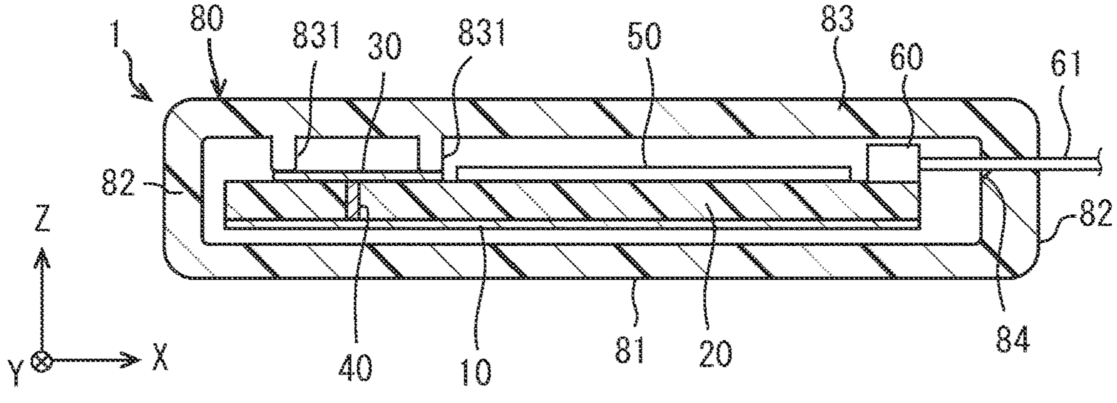
FIG. 19 is a diagram illustrating an example of an overall configuration of the wireless communication device including a casing.

The wireless communication device 1 includes a casing 80 that houses a circuit board on which the zeroth-order resonant antenna element ANT, the control circuit 50, and the like are mounted. FIG. 19 is a schematic diagram showing an internal configuration of the casing 80. In order to ensure clarity of the drawings, hatching indicating the material type may be omitted for some members. In addition, illustration of a part of the configuration of the feed point 31 and the like is omitted.

The casing 80 is formed by combining, for example, an upper casing and a lower casing that are vertically separable. The casing 80 is made of, for example, a polycarbonate (PC) resin. The material of the casing 80 may employ various resins, such as synthetic resin obtained by mixing acrylonitrile-butadiene-styrene copolymer (so-called ABS) with PC resin, and polypropylene (PP). The casing 80 includes a casing bottom 81, a lateral wall 82, and a casing top plate 83. The casing bottom 81 provides a bottom of the casing 80. The casing bottom 81 is formed in a flat plate shape. In the casing 80, the circuit board is arranged so that the ground plate 10 faces the casing bottom 81.

The lateral wall 82 provides a lateral surface of the casing 80, and extends upward from an edge of the casing bottom 81. A height of the lateral wall 82 is designed so that, for example, a distance between an inner surface of the casing top plate 83 and the counter conductor plate 30 is λ/25 or less. The casing top plate 83 provides an upper surface of the casing 80. The casing top plate 83 in this embodiment is formed in a flat plate shape. The shape of the casing top plate 83 may be various other shapes such as a dome shape. An inner surface of the casing top plate 83 faces the antenna formation surface 20A. The lateral wall 82 has a cable lead-out portion 84 that is a hole through which the communication cable 61 and other cables are lead out. Since the cable lead-out portion 84 is provided on the lateral wall 82, it is possible to improve an ease of installation of the wireless communication device 1 in the B-pillar 91 or the like.

When the casing top plate 83 is disposed in a region close to the counter conductor plate 30 as in the above configuration, a wave of the vertical electric field radiated by the LC resonance mode can be prevented from propagating around the edge of the counter conductor plate 30 to its upper side. Thus, a radiation gain in the antenna horizontal direction can be increased. The "region close to the counter conductor plate 30" is, for example, a region stretching from the counter conductor plate 30 by an electrical length of 1/25 or less of the target wavelength.

In addition, as shown in FIG. 19, the casing top plate 83 may have an upper rib 831 that is in contact with the edge of the counter conductor plate 30. The upper rib 831 is formed on the inner surface of the casing top plate 83 and protrudes downward. The upper rib 831 is formed so as to be in contact with the edge of the counter conductor plate 30. The upper rib 831 fixes the position of the support portion 20 in the casing 80. The upper rib 831 obstructs the propagation of the ground-plate vertically-polarized wave from the edge of the counter conductor plate 30 to its upper side, thereby increasing the radiation gain in the antenna horizontal direction. A metal pattern such as copper foil may be arranged to the vertical surface (that is, the outer surface) of the upper rib 831 that is connected to the edge of the counter conductor plate 30.

In addition, the inside of the casing 80 may be filled with a sealing material such as silicon The sealing material may be a urethane resin such as polyurethane prepolymer. The sealing material may be selected from among various other materials such as epoxy resin and silicone resin. In FIG. 19, the sealing material is omitted in order to ensure clarity of the drawing. According to the configuration in which the casing 80 is filled with the sealing material, the sealing material located above the counter conductor plate 30 obstructs the propagation of the ground-plate vertically-polarized wave from the edge of the counter conductor plate 30 to its upper side, thereby exerting the effect of increasing the radiation gain in the antenna horizontal direction. At least the lateral wall 82 and the casing top plate 83 of the casing 80 may be made of resin or ceramic having a predetermined relative permittivity. Further, according to the configuration in which the casing 80 is filled with the sealing material, waterproofness, dustproofness, and vibration resistance can be improved.

Of course, the filling of the casing 80 with the sealing material is optional. The upper rib 831 may be also optional. The casing top plate 83, the upper rib 831, and the sealing material correspond to a radio wave shield body that obstructs the propagation of the wave of the vertical electric field radiated by the LC resonance mode from the edge of the counter conductor plate 30 to its upper side. The configuration disclosed above corresponds to a configuration in which the radio wave shield body containing a conductor or a dielectric material is arranged on the upper side of the counter conductor plate 30.

Either of the casing bottom 81 or the casing top plate 83 included in the casing 80 may be omitted. When either the casing bottom 81 or the casing top plate 83 is omitted, the sealing material may be a resin that is in a solid state within a predetermined operating temperature range assumed as a temperature range of an environment in which the wireless communication device 1 is used. The operating temperature range can be, for example, from −30° C. to 100° C. A configuration in which one of the casing bottom 81 and the casing top plate 83 is omitted corresponds to a casing in which a top surface or a bottom surface of the casing is an opening.

Additional Notes

The present disclosure also includes the following configurations.

Configuration 1

An antenna module for transmitting and receiving radio waves of a predetermined target frequency, the antenna module comprising:

- a ground plate (10) that is a conductor plate having a rectangular shape with a length less than λ/2 in a widthwise direction and a length of λ/2 or more in a lengthwise direction, wherein λ is a wavelength of the predetermined target frequency;
- a counter conductor plate (30) that is conductor member having a flat plate shape, is arranged at a position shifted in the lengthwise direction from the center of the ground plate and at a predetermined distance from the ground plate, and has a feed point (31) electrically connected to a feedline (51); and a short circuit portion (40) arranged in a central region of the counter conductor plate and electrically connecting the counter conductor plate and the ground plate, the ground plate, the counter conductor plate and the short circuit portion are configured such that an inductance of the short circuit portion and a capacitance between the ground plate and the counter conductor plate cause parallel resonance at the target frequency, and a length (Lg) of the ground plate in the lengthwise direction is set to satisfy a formula: $Lg=\lambda/4\times N+\alpha$, where N is a natural number, and a is a predetermined value greater than or equal to $0.025\lambda$ and less than or equal to $0.225\lambda$.

Configuration 2

An antenna module for transmitting and receiving radio waves of a predetermined target frequency, the antenna module comprising:

a ground plate (10) that is a conductor plate having a rectangular shape with a length less than $\lambda/2$ in a widthwise direction and a length of $\lambda/2$ or more in a lengthwise direction, wherein $\lambda$ is a wavelength of the predetermined target frequency;

a counter conductor plate (30) that is conductor member having a flat plate shape, is arranged at a position shifted in the lengthwise direction from the center of the ground plate and at a predetermined distance from the ground plate, and has a feed point (31) electrically connected to a feedline (51); and a short circuit portion (40) arranged in a central region of the counter conductor plate and electrically connecting the counter conductor plate and the ground plate, the ground plate, the counter conductor plate and the short circuit portion are configured such that an inductance of the short circuit portion and a capacitance between the ground plate and the counter conductor plate cause parallel resonance at the predetermined target frequency, the ground plate has an antenna near end that is one of ends of the ground plate closer to the counter conductor plate in the lengthwise direction, and the counter conductor plate is positioned such that an end offset (De) which is a distance from the antenna near end (11) to the counter conductor plate is set to $0.075\lambda$ or more.

What is claimed is:

1. A wireless communication device for transmitting and receiving radio waves of a predetermined target frequency, the wireless communication device comprising:

a ground plate that is a conductor plate having a rectangular shape with a length less than $\lambda/2$ in a widthwise direction and a length of $\lambda/2$ or more in a lengthwise direction, wherein $\lambda$ is a wavelength of the predetermined target frequency;

a zeroth-order resonant antenna element arranged at a position shifted by a predetermined distance in the lengthwise direction from a center of the ground plate; and a circuit module configured to perform processing for signal transmission and signal reception by the zeroth-order resonant antenna element, wherein the zeroth-order resonant antenna element and the circuit module are arranged side by side in the lengthwise direction of the ground plate, the zeroth-order resonant antenna element includes a counter conductor plate that is conductor member having a flat plate shape, is arranged at a predetermined distance from the ground plate, and has a feed point electrically connected to a feedline, and a short circuit portion arranged in a central region of the counter conductor plate and electrically connecting the counter conductor plate and the ground plate, the ground plate, the counter conductor plate and the short circuit portion are configured such that an inductance of the short circuit portion and a capacitance between the ground plate and the counter conductor plate cause parallel resonance at the predetermined target frequency, and a length of the ground plate in the lengthwise direction is set to satisfy $Lg=\lambda/4\times N+\alpha$, where N is a natural number, $\alpha$ is a predetermined value greater than or equal to $0.025\lambda$ and less than or equal to $0.225\lambda$, and Lg is the length of the ground plate in the lengthwise direction.

2. The wireless communication device according to claim 1, wherein the counter conductor plate has a square shape or a circular shape, and is provided at a position shifted by a predetermined distance in the lengthwise direction from a position concentric with the ground plate, and the feed point is provided at an edge of the counter conductor plate facing in a direction toward the center of the ground plate.

3. The wireless communication device according to claim 1, wherein the ground plate has an antenna near end that is one of ends of the ground plate closer to the counter conductor plate in the lengthwise direction, and an antenna far end that is the other of the ends of the ground plate farther from the counter conductor plate in the lengthwise direction, and the ground plate includes a folded portion that is a conductor member provided at the antenna far end and extending toward the antenna near end.

4. The wireless communication device according to claim 1, wherein the ground plate has an antenna near end that is one of ends of the ground plate closer to the counter conductor plate in the lengthwise direction, and an antenna far end that is the other of the ends of the ground plate farther from the counter conductor plate in the lengthwise direction, and the ground plate includes a folded portion that is a conductor member provided at the antenna near end and extending toward the antenna far end.

5. The wireless communication device according to claim 1, further comprising an additional conductor that is a conductor member having a plate shape and provided on a lateral side or a lower side of the counter conductor plate such that the additional conductor is parallel to the ground plate and arranged at a predetermined distance from the counter conductor plate, wherein the additional conductor is electrically connected to the ground plate via a short-circuit pin which is a conductive member.

6. A wireless communication device for transmitting and receiving radio waves of a predetermined target frequency, the wireless communication device comprising:

a ground plate that is a conductor plate having a rectangular shape with a length less than $\lambda/2$ in a widthwise direction and a length of $\lambda/2$ or more in a lengthwise direction, wherein $\lambda$ is a wavelength of the predetermined target frequency;

a zeroth-order resonant antenna element arranged at a position shifted by a predetermined distance in the lengthwise direction from a center of the ground plate; and a circuit module configured to perform processing for signal transmission and signal reception by the zeroth-order resonant antenna element, wherein the zeroth-order resonant antenna element and the circuit module are arranged side by side in the lengthwise direction of the ground plate, the zeroth-order resonant antenna element includes a counter conductor plate that is conductor member having a flat plate shape, is arranged at a predetermined distance from the ground plate, and has a feed point electrically connected to a feedline, and a short circuit portion arranged in a central region of the counter conductor plate and electrically connecting the counter conductor plate and the ground plate, the ground plate, the counter conductor plate and the short circuit portion are configured such that an inductance of the short circuit portion and a capacitance between the ground plate and the counter conductor plate cause parallel resonance at the predetermined target frequency, the ground plate has an antenna near end that is one of ends of the ground plate closer to the counter conductor plate in the lengthwise direction, and the counter conductor plate is positioned such that an end offset which is a distance from the antenna near end to the counter conductor plate is set to 0.075λ or more.

* * * * *